Sept. 3, 1929.  W. J. McGARVEY  1,727,075
COOKING VESSEL
Filed Jan. 10, 1928

Inventor
W. J. McGarvey
By
Frease and Bond  Attorneys

Patented Sept. 3, 1929.

1,727,075

UNITED STATES PATENT OFFICE.

WILLIAM J. McGARVEY, OF WOOSTER, OHIO, ASSIGNOR TO THE BUCKEYE ALUMINUM COMPANY, OF WOOSTER, OHIO, A CORPORATION OF OHIO.

COOKING VESSEL.

Application filed January 10, 1928. Serial No. 245,645.

The invention relates to cooking vessels of that type provided with a steam-tight cover whereby a heat retaining compartment is provided in which the food may be cooked in its own juices without the addition of water.

In recent years cooking vessels have come into general use in which the vessel is adapted to be placed upon a base or the like located over a stove burner or flame, a steam-tight cover being provided for the vessel and having a number of clamps for tightly clamping the same upon the vessel in order to form a heat retaining compartment within the vessel to prevent the escape of the vapors and steam from the cooking food.

Food cooked in such cooking vessels retains all of its natural flavor since the food is steamed in the vapors generated from its own juices, without the addition of water.

However, in order to provide for a steam-tight cover, it has been customary to place a number of clamps upon the cover adapted to engage a bead or rim or the like upon the body of the cooking vessel.

It has been found by experience that such clamps are objectionable as they are cumbersome and require time and work to clamp and unclamp the same when placing the cover upon the vessel and removing the same therefrom, either to inspect the cooking food or to remove the food from the vessel when cooked.

The object of the present improvement is to provide a cooking vessel of the general character referred to, having a steam-tight cover arranged to be quickly and easily placed upon the vessel or removed therefrom without the necessity of using any clamps or the like for holding the cover upon the vessel.

The above and other objects may be attained by providing a cooking vessel having a seat formed at its upper open end to receive the cover, said seat being surrounded by a concaved annular flange, the cover having a depending flange provided with a peripheral convex portion for frictional engagement within the concave flange of the vessel whereby when the cover is seated within the upper open end of the vessel, a steam-tight joint is formed between the cover and vessel and the cover is frictionally retained in position upon the vessel, while at the same time it may be removed without any considerable effort.

Figure 1:
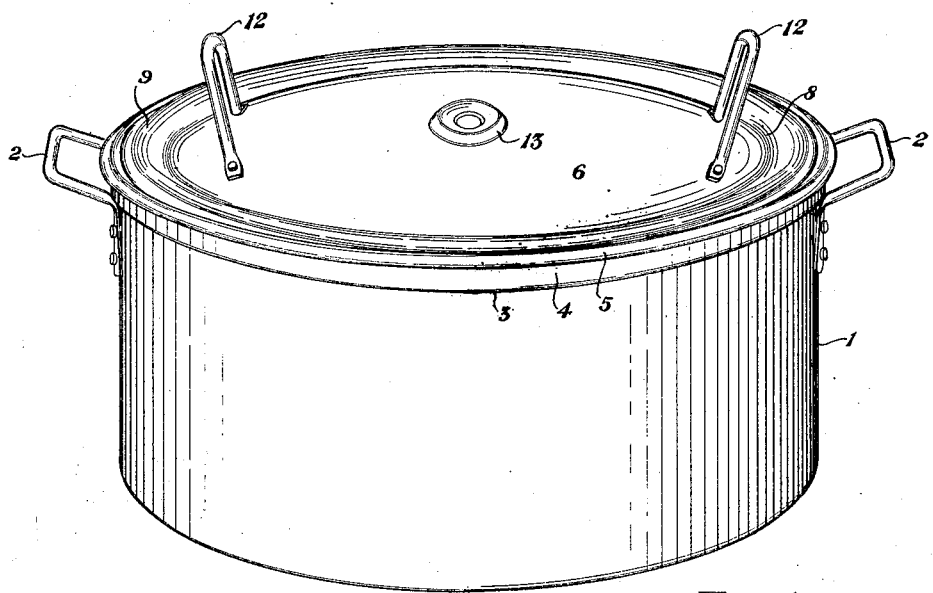
Figure 2:
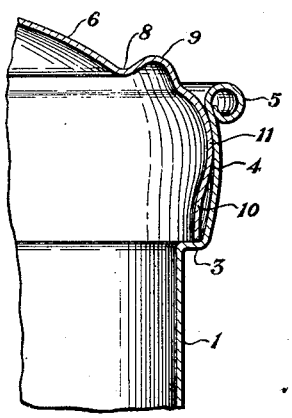

An embodiment of the invention is illustrated in the accompanying drawing, in which Figure 1 is a perspective view of the improved cooking vessel; and Fig. 2, an enlarged sectional view through the upper open end portion of the vessel and the adjacent portion of the cover.

Similar numerals refer to similar parts throughout the drawing.

The cooking vessel 1 may be formed of sheet metal, preferably aluminum, of any well known construction and provided at diametrically opposite sides near its upper open end with the handles 2 by means of which it may be placed upon or removed from the usual base upon which such cooking vessels are placed over a flame or stove burner.

The invention contemplates the provision of a peripheral seat at the upper edge of the cooking vessel for the reception of the cover, and so arranged that the cover may be easily and readily placed upon or removed from the vessel while at the same time providing a snug steam-tight fit between the cover and vessel.

This seat may be formed by bending the wall of the vessel outward peripherally as at 3 and then bending the same upward to form the concave peripheral flange 4 which may terminate at its upper edge in the annular bead 5 around the top of the vessel.

The cover 6 may be substantially of dome-shape to permit the steam and vapors condensing thereon to drip back into the receptacle around the peripheral portion of the cover.

For the same purpose, as well as for strengthening and reinforcing the lid, an annular depression 8 may be formed near the periphery thereof, terminating in the upwardly disposed annular strengthening rib 9.

The metal of the lid is then bent downward to form a depending annular flange 10 provided with the peripheral rib or convex portion 11 of slightly greater diameter than the concave flange 4 at its upper edge and terminating in a reduced depending portion. As well shown in Fig. 2, the convex portion 11 of the cover or lid 6 has a greater curvature than the concave portion 4 of the peripheral flange at the upper edge of the vessel.

With this construction, as the lid is pressed down into the upper open end of the vessel, the peripheral rib 11 thereon will be sprung into place within the concave flange 4 of the vessel, assuming the position best shown in Fig. 2 of the drawing.

In this position, the lower edge of the depending cover flange seats upon the annular seat 3 of the vessel while the peripheral rib 11 of the cover flange frictionally engages the concave flange 4 of the vessel at a point slightly below the upper restricted edge thereof.

The cover is thus frictionally held against displacement upon the vessel, forming a steam-tight joint with the same while very little effort is required to remove the cover or replace the same upon the vessel by means of the handles 12.

A valve, as indicated generally at 13, may be provided in the cover to prevent the steam pressure within the vessel being raised above the desired point, this valve being adapted in the usual manner to be opened by the pressure of the steam to permit the same to escape whenever necessary.

From the above it will be seen that a simple and effective means is provided for forming a steam-tight joint between the cover and vessel without the use of clamps or the like and which permits of easy operation of the cover in placing the same upon the vessel or removing it therefrom.

I claim:

1. A cooking vessel having a seat formed at its upper open end by bending the metal outward and then upward in a concave peripheral flange, and a cover for the vessel having a peripheral flange provided with a convex portion of greater curvature than the concave flange and terminating in a reduced depending portion, the reduced depending portion being pressed downward within the vessel against the seat by engagement of the concave peripheral flange with the convex portion of the cover flange.

2. A cooking vessel having a peripheral seat adjacent its upper open end, and a concave peripheral flange extending upward from the seat, a cover for the vessel, a convex peripheral flange on the cover of greater curvature than the concave flange, and an annular flange extending from the convex flange, the cover being received by the vessel with the convex flange engaged by the concave flange to press the cover downward within the vessel, and the annular flange engaging the peripheral seat to prevent downward motion of the cover, whereby the cover is frictionally held by the vessel and a steam tight joint is formed between the cover and vessel.

In testimony that I claim the above, I have hereunto subscribed my name.

WILLIAM J. McGARVEY.